Figure 2:
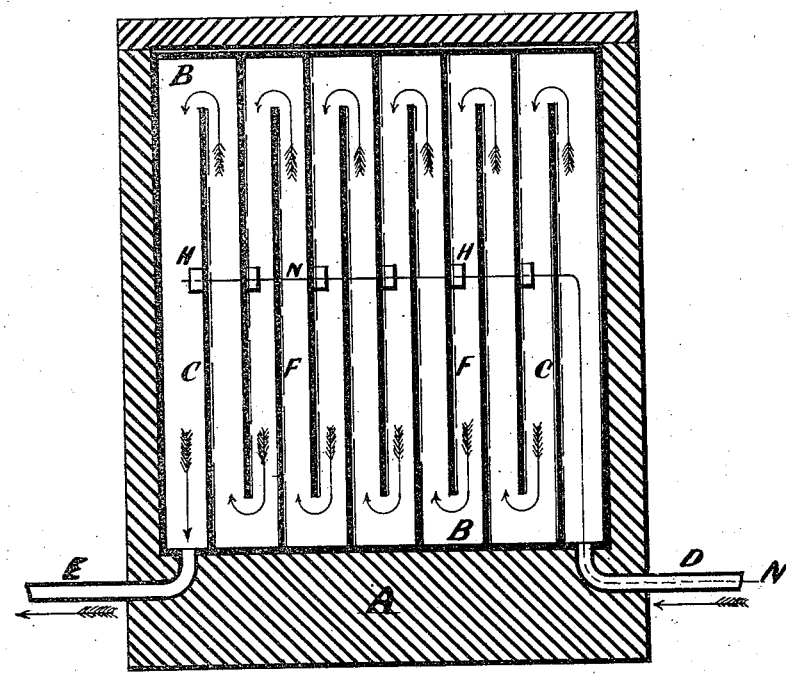

(No Model.)

H. FEWSON.
APPARATUS FOR TREATING NOXIOUS GASES WITH ELECTRICITY.

No. 387,286. Patented Aug. 7, 1888.

Witnesses:
F. Barrett.
Rud. Schnetzler.

Inventor:
Hartley Fewson.
Per: James N. Lancaster
Atty

UNITED STATES PATENT OFFICE.

HARTLEY FEWSON, OF BUCKINGHAM, COUNTY OF BUCKS, ENGLAND.

APPARATUS FOR TREATING NOXIOUS GASES WITH ELECTRICITY.

SPECIFICATION forming part of Letters Patent No. 387,286, dated August 7, 1888.

Application filed December 3, 1886. Renewed July 11, 1888. Serial No. 279,684. (No model.) Patented in England May 28, 1886, No. 7,174; in France June 26, 1886, No. 177,047, and in Belgium June 28, 1886, No. 73,649.

*To all whom it may concern:*

Be it known that I, HARTLEY FEWSON, a subject of the Queen of Great Britain and Ireland, and a resident of the town and county of Buckingham, England, have invented certain Improvements in the Treatment of Sewer and other Similar Noxious Gases, (for which I have applied for a British patent, No. 7,174, dated May 28, 1886; for a French patent No. 177,047, dated June 28, 1886; for a Belgium patent No. 73,649, dated June 28, 1886, and for a German patent, not yet granted, the last notification from that office bearing the number F. 2,876, dated April 2, 1887,) of which the following is a specification.

My invention for improvements in the treatment of sewer and other similar noxious gases has for its principal object to construct an apparatus through which any sewer or other noxious gases passed shall be rendered harmless and incapable of assisting in the decomposition of animal matter.

In carrying my invention into practical effect, the sewer or other noxious gases are drawn by a fan, pump-bellows, or other suitable apparatus from the drain or other place containing the same and are forced through apparatus of special construction. The outer case of this apparatus consists of a box or other suitable vessel supported on glass blocks and lined throughout with glass. This box is fitted with inlet and outlet pipes at its opposite ends and with glass partitions arranged so that the gases passed through the apparatus are forced to take a zigzag course from the inlet to the outlet. The number of glass partitions is any suitable odd number. Each glass partition is covered on the inlet side—that is, on the side nearest the inlet of the gases—with tin-foil. A small platinum wire passes in front of each sheet of tin-foil, but at a short distance therefrom. A similar wire passes in front of the glass side of that plate nearest the outlet-pipe. Two insulated electrical conductors are led into the box, and the platinum wire in front of the plate nearest to the inlet-pipes and the wires in front of each alternate plate are connected to the positive conductor. The remaining wires, including the one opposite the glass side of that plate nearest the outlet-pipe, are connected to the negative conductor. When the gases are to be treated, the conductors are connected, respectively, to the positive and negative poles of an electric generator. The gases in passing through the apparatus are thus subjected to electrolysis and are decomposed and form fresh combinations, oxygen being liberated from sewer or other noxious gases and ozone being formed at the last glass partition. The resultant gases delivered from the apparatus are passed into water, the oxygen vitalized by the presence of ozone, and the nitrogen rising up through the water and being discharged in a harmless state.

Figure 1:
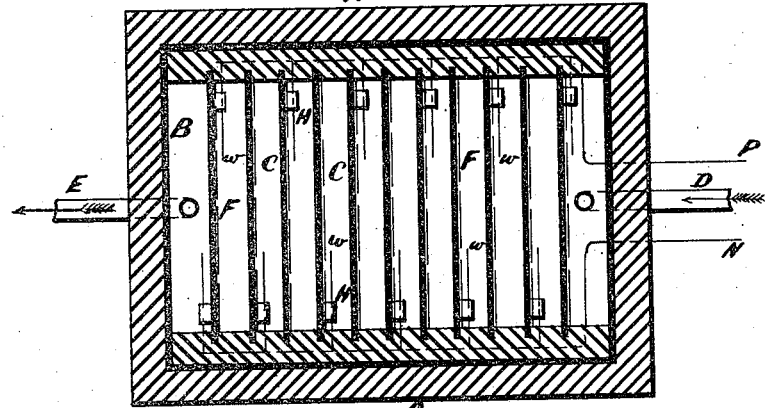

In the accompanying sheet of drawings, Figure 1 is a sectional plan of one form of apparatus for the treatment of sewer and other noxious gases, constructed according to this invention; and Fig. 2 is a longitudinal section of the same.

The box A is lined with glass B, and is provided with glass partitions C, arranged as shown. The gases to be treated enter by the pipe D and pass in a zigzag course, as shown by the arrows in Fig. 2, to the outlet E. Each partition C is covered on the inlet side with tin-foil. (Shown by the interrupted lines F.) The two electrical conductors P N are led into the box, as shown, and are connected to small platinum wires W, which are arranged in front of the sheets of tin-foil and of the glass or uncovered side of the plate C, nearest the outlet, at some slight distance therefrom, the wires W being connected alternately to the conductors P N, and being supported by insulating-blocks H cemented to the partitions C.

It will readily be understood that the glass may be replaced by any suitable insulator.

I am aware of the patent to C. F. Dunderdale, No. 100,736, dated March 15, 1870, wherein apparatus is described for producing ozone, consisting of a box with spaces, plates of glass for the passage of the gas and electric current, and therefore do not broadly claim any of these parts.

I claim as my invention and desire to secure by Letters Patent—

In an apparatus for the treatment of sewer-gases, the combination of the box A, lined with glass, the glass partitions C, so arranged as to give the gas a zigzag course, the inlet-pipe D, and the outlet E, all combined as shown, and acted upon by an electric current, for the purpose set forth.

In testimony whereof I have signed my name to this specification in the presence of two subscribing witnesses.

HARTLEY FEWSON.

Witnesses:
 RICHARD BOULTBEE,
 GEORGE PAGE,
  *Both of Buckingham, England.*